United States Patent
Balondrade

(10) Patent No.: US 11,879,755 B2
(45) Date of Patent: Jan. 23, 2024

(54) METHOD FOR DETERMINING THE POSITION OF A ROTARY ELEMENT OF A VEHICLE BASED ON A POSITION SENSOR

(71) Applicant: Continental Automotive GmbH, Hannover (DE)

(72) Inventor: Gaël Balondrade, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/901,154

(22) Filed: Sep. 1, 2022

(65) Prior Publication Data

US 2023/0063728 A1    Mar. 2, 2023

(30) Foreign Application Priority Data

Sep. 2, 2021    (FR) ...................................... 2109192

(51) Int. Cl.
*G01D 5/24* (2006.01)
*G01D 5/244* (2006.01)

(52) U.S. Cl.
CPC .................... *G01D 5/244* (2013.01)

(58) Field of Classification Search
CPC ...................................................... G01D 5/244
See application file for complete search history.

(56) References Cited

U.S. PATENT DOCUMENTS

| 9,124,211 B2* | 9/2015 | Suzuki | .................... H02P 6/085 |
| 9,389,060 B2* | 7/2016 | Romero | ............... G01R 33/077 |
| 2008/0078361 A1 | 4/2008 | Matthews et al. | |

FOREIGN PATENT DOCUMENTS

| DE | 10260862 A1 | 7/2004 |
| DE | 102006032144 A1 | 2/2007 |

OTHER PUBLICATIONS

French Search Report for French Application No. 2109192, dated May 4, 2022 with translation, 11 pages.

* cited by examiner

*Primary Examiner* — Reena Aurora
(74) *Attorney, Agent, or Firm* — RatnerPrestia

(57) ABSTRACT

A method for determining the position of a rotary element of a motor vehicle based on a position sensor configured to measure the position of the rotary element, to simultaneously generate a sine-type output signal and a cosine-type output signal reflecting the angular position of said rotary element as it rotates and to deliver these output signals to a control module of the vehicle, the method, implemented by the control module, including the steps of rotating the rotary element, receiving the output signals generated by the position sensor as the rotary element rotates, determining the average period of the output signals received within a predetermined time range, correcting both received output signals such that the period of each of the signals is equal to the determined average period, and determining the angular position of the rotary element based on the corrected output signals.

9 Claims, 4 Drawing Sheets

METHOD FOR DETERMINING THE POSITION OF A ROTARY ELEMENT OF A VEHICLE BASED ON A POSITION SENSOR

CROSS REFERENCE TO RELATED APPLICATIONS

This application claims priority to French Patent Application No. 2109192, filed Sep. 2, 2021, the contents of such application being incorporated by reference herein.

FIELD OF THE INVENTION

The present invention relates to the automotive field and more particularly to a method for processing signals generated by a position sensor for the position of a vehicle rotary element, and to a control module implementing said method.

BACKGROUND OF THE INVENTION

In an electric or hybrid vehicle, in particular one with a synchronous electric machine, it is known practice to use a sensor to determine the position of the rotor of the electric machine in order to allow an electronic control unit to control the electric machine via a power converter.

This type of sensor is preferably placed in line with the end of the rotor shaft and sends the information on angular position to the electronic control unit so that it controls the power converter and thereby controls the electric machine.

This type of sensor, known as a "resolver", comprises, in a known manner, an integrated circuit comprising one or more sensitive elements which is associated with a bipolar magnet positioned at the end of the shaft facing the sensor for axial reading. The one or more sensitive elements of the sensor allow the rotary angle of the magnetic vector of the magnet to be detected. The measured angle is transcribed into two, sine and cosine, output signals. The electronic control unit simultaneously receives these two output signals and determines the rotor absolute angle, via an arctan trigonometric calculation.

Effects from the environment or of the technology used (sensor, magnet, etc.) tend to deform these output signals, in particular in terms of amplitude and phase, which leads to a residual error in the estimation of the angle. This error may be large and lead to a motor control fault. More particularly, if the position of the rotor goes beyond a predefined limit in the vehicle's safety control system, the electric machine is stopped and the vehicle is immobilized, which is one of the most significant breakdowns for a motor vehicle.

In the prior art, the solution adopted to reduce signal deformation and therefore the residual error in these sensors consists in using correctors for amplitude, offset and orthogonality which are associated with time-domain filtering at a set cutoff frequency. Time-domain filtering is used for its implementational simplicity. The filtering is low frequency because the wanted signal is low frequency: a rotor rotational speed conventionally between, for example, 0 and 20000 RPM corresponds to a frequency band between 0 and 333 Hz.

The correctors for amplitude, offset and orthogonality make it possible to compensate at least partially for deformations in the amplitude and timing of the signals, respectively. The orthogonality corrector makes it possible to correct the phase shift in the signals so as to keep it at a value of the order of 90°.

The performance of this method is firstly limited by the effectiveness of the correctors, which do not allow the residual error to be sufficiently reduced. In particular, as the signals deform notably when their slope is maximum, shifts in offset and therefore in orthogonality are commonplace and difficult to correct with the existing correctors.

Additionally, since the filtering is dependent on the frequency of the signal, i.e. on the rotation of the shaft, the performance of the method is therefore dependent on the rotational speed of the rotor. In particular, the estimation error is greater at low rotational speed or in an acceleration phase, which presents a major drawback. More specifically, the yield of the electric machine is not optimized for the entire operating range but is dependent on the filtering, which is in turn dependent on the speed.

There is therefore a need for a solution that makes it possible to at least partially overcome these drawbacks.

SUMMARY OF THE INVENTION

To that end, a first aspect of the invention is a method for determining the position of a rotary element of a motor vehicle based on a position sensor, said position sensor being configured to measure the position of the rotary element, to simultaneously generate a sine-type output signal and a cosine-type output signal reflecting the angular position of said rotary element as it rotates and to deliver these output signals to a control module of the vehicle, said method, implemented by said control module, comprising the steps of:
  rotating the rotary element,
  receiving the output signals generated by the position sensor as the rotary element rotates,
  determining the average period of the output signals received within a predetermined time range,
  correcting both received output signals such that the period of each of the signals is equal to the determined average period,
  determining the angular position of the rotary element based on the corrected output signals.

What is meant by "average period of the signals" is the average of the average period of the sine signal and of the average period of the cosine signal.

The method makes it possible to achieve the establishment of a steady state in order to determine the period of the signal in a small time range, the period then being stabilized, which allows the signals to be corrected with a stable and precise period value in order to eliminate the deformations which lead to errors in the estimation of the angular position. The use of the average period thus makes it possible to eliminate the time offset created by the deformations of the signal in the predetermined time range. Additionally, by smoothing the estimate of the period using its average, the speed information may be filtered so as to obtain a more accurate speed estimate.

According to one feature of an aspect of the invention, the position of the rotary element is determined at a given time by calculating the arctan of the values of the sine and cosine signals at said given time.

Preferably, the method, prior to determining the average period of the output signals received in the predetermined time range, determining the acceleration of the rotation of the rotary element, the steps of determining the average period of and correcting the received output signals, and of determining the angular position of the rotary element based on the corrected output signals are implemented only when the acceleration value is lower than a predetermined threshold characterizing a steady state.

According to one aspect of the invention, the method comprises a step of calculating the average of the periods of the sine signal generated in the predetermined time range and the average of the periods of the cosine signal generated in the predetermined time range.

Advantageously, the operation of determining the average period of the received output signals is carried out by calculating the average of the periods of each output signal in the predetermined time range, each period being measured for each of the two output signals between two consecutive zero amplitudes of said signal.

Preferably, the duration of the predetermined time range may be chosen so as to meet the needs in terms of dynamics and angular precision desired for controlling the rotary element, for example for controlling the rotor in the case of an electric machine.

Advantageously, the method comprises, before correcting the output signals in terms of period, a step of checking that the average period is below a predefined period threshold or above a predefined speed threshold, in order to ensure that the speed is high enough to have reached a steady state. This threshold may be determined as a function of the desired system dynamics.

Advantageously, the acceleration may be defined by calculating a difference in rotational speed of the rotary element between two consecutive revolutions.

Preferably, the predetermined acceleration threshold is determined as a function of the desired system dynamics.

Advantageously, the method comprises, prior to determining the average period or when the acceleration value is higher than the predetermined acceleration threshold, a step of correcting the output signals in terms of amplitude and/or offset.

Advantageously, the method comprises, prior to correcting the output signals in terms of period, a step of time-domain filtering the received signals at a set cutoff frequency.

An aspect of the invention also relates to a computer program product comprising a set of program code instructions, which, when they are executed by one or more processors, configure the one or more processors to implement a method as presented above.

An aspect of the invention also relates to a control module for a vehicle, configured to implement the method as presented above.

The control module may be an electronic control unit (ECU) mounted in the vehicle at a distance from the sensor and connected to said sensor by a communication link in order to receive the output signals generated by the sensor.

As a variant, the control module may be integrated into the same housing as the sensor, for example by taking the form of a preprogrammed digital signal processor (DSP).

An aspect of the invention also relates to a motor vehicle comprising a rotary element, a sensor for the angular position of said rotary element and a control module as presented above.

In one embodiment, the rotary element is an electric machine rotor.

BRIEF DESCRIPTION OF THE DRAWINGS

Further features and advantages of aspects of the invention will become more clearly apparent from reading the following description. This description is purely illustrative and should be read with reference to the appended drawings, in which.

DETAILED DESCRIPTION OF THE PREFERRED EMBODIMENTS

Figure 1:
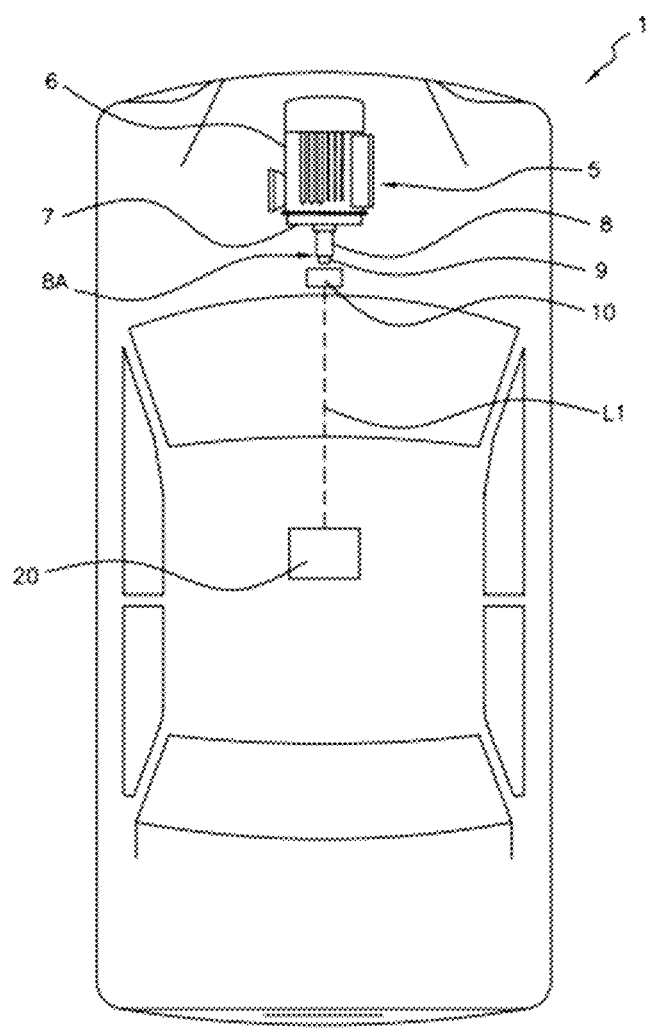
FIG. 1 schematically shows one embodiment of the vehicle according to the invention.

FIG. 1 shows one example of a vehicle 1 according to an aspect of the invention. Preferably, the vehicle 1 is a motor vehicle 1, in particular an electric or hybrid motor vehicle.

The vehicle 1 comprises an electric machine 5, a sensor 10 and a control module 20.

Electric Machine 5

The electric machine 5 comprises a stator 6 in which is mounted a rotor 7 allowing the provision of a torque suitable for driving the wheels of the vehicle 1.

The rotor 7 comprises a central rotary shaft 8 having a free end 8A on which a bipolar magnet 9 is mounted.

Sensor 10

The sensor 10 is a position sensor allowing the angular position of the rotor to be determined by measuring the angular position of the central shaft 8.

To that end, the sensor 10 comprises an integrated circuit and one or more sensitive elements (not shown for the sake of clarity) allowing the rotary angle of the magnetic vector of the bipolar magnet 9 to be detected as it rotates.

The integrated circuit is designed to simultaneously generate, based on the magnetic vector detected by the one or more sensitive elements, a sine-type output signal and a cosine-type output signal reflecting the angular position of the rotor 7 as it rotates and to deliver these two output signals to the control module 20.

Since this type of sensor 10 is known per se, it will not be described in more detail here.

Control Module 20

The control module 20 uses the information sent by the sensor 10 to determine the angular position of the rotor 7. To that end, the control module 20 is configured to receive the two measured output signals generated by the sensor 10 as the rotor 7 rotates in order to determine the angular position of the rotor 7 and to control the power converter so as to allow the electric machine 5 to be controlled as a function of the determined angular position.

The control module 20 is configured to determine the rotational acceleration of the rotor 7 based on the received output signals. For example, the acceleration may be determined by calculating the difference in rotational speed of the rotor 7 between two consecutive revolutions.

The control module 20 is configured to compare the determined acceleration value with a predetermined acceleration threshold S (FIG. 2) characterizing a steady state, for example a difference in speed of X m/s between two consecutive rotations of the rotor 7.

The control module 20 is configured to calculate the average period of the output signal in terms of sine and the average period of the output signal in terms of cosine and then calculate the average of the two average periods thus calculated.

The control module 20 is configured to correct both output signals received from the sensor 10 such that the period of each of the signals becomes equal to the determined average period.

The control module 20 is configured to determine the angular position of the rotor 7 based on the output signals as corrected using an arctan calculation known per se.

The predetermined time range may advantageously be chosen as a function of the rotational speed range of the rotor 7 in order to ensure that the speed remains substantially constant for said time range.

Advantageously, the control module 20 may also be configured to correct the sine and cosine signals before the calculation in order to reduce the estimation error. For example, knowing the last angular position calculated for the rotor 7 and the duration elapsed since the last angular position calculated (sampling period), ideal sine and cosine signals may be determined before calculating the new value of the angular position of the rotor 7.

The control module 20 comprises a processor able to implement a set of instructions allowing these functions to be performed.

Preferably, the control module 20 is an electronic control unit (ECU) mounted in the vehicle 1 at a distance from the sensor 10 and connected to said sensor 10 by a communication link L1 in order to receive the output signals generated by the sensor 10.

As a variant, the control module 20 may be integrated into the same housing as the sensor 10, for example by taking the form of a preprogrammed digital signal processor (DSP).

Exemplary Implementation

Figure 2:
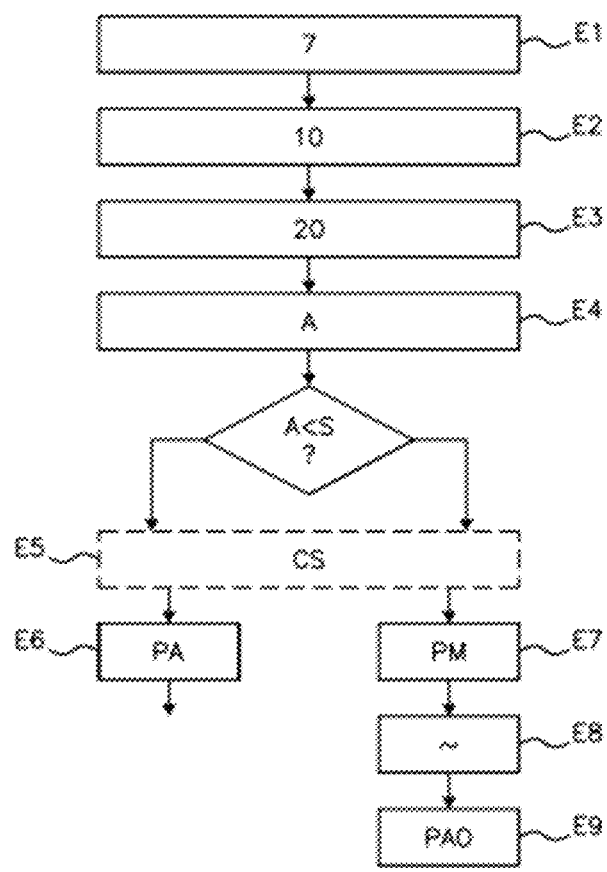
FIG. 2 schematically shows one embodiment of the method according to the invention.

First, with reference to FIG. 2, the rotor 7 is made to rotate in a step E1.

The integrated circuit of the sensor 10, which is supplied with electrical power by a battery of the vehicle 1, then detects, via the one or more sensitive elements, the variations in magnetic field produced by the bipolar magnet 9 as it rotates concentrically at the end of the central shaft 8 of the rotor 7 and simultaneously generates a sine signal and a cosine signal in a step E2.

These signals are received by the control module 20 via the communication link L1 in a step E3.

The control module 20 then determines, based on the signals received from the sensor 10, the instantaneous acceleration value A of the rotor 7 in a step E4.

When the acceleration value A is lower than the predetermined threshold S characterizing a steady state, the control module 20 does not make any correction or optionally makes a standard correction CS for amplitude and/or offset and/or orthogonality in a step E5. Since the sensor signals are off-center, for example varying between 1 V and 4 V, i.e. an offset with respect to the average amplitude of +2.5 V, the offset correction consists in recentering the signals on 0 V amplitude. Additionally, since the amplitudes may fluctuate due to environmental constraints, amplitude correction consists in correcting the signal so that the signal maxima exhibit the same amplitude and the signal minima exhibit the same amplitude. These compensations are made in a known way by detecting the minima and maxima and correcting the signals in the aforementioned manner.

The control module 20 next calculates the angle giving the angular position PA of the rotor 7 by trigonometrically calculating the arctan of the received signals in a step E6.

When the acceleration value A is lower than the predetermined threshold S characterizing a steady state, the control module 20 optionally makes a standard correction CS for amplitude and/or offset and/or orthogonality in a step E5, determines the average period PM of the output signals received in the predetermined time range (i.e. the average of the average periods of both the received sine and the cosine signals) in a step E7, modifies (i.e. transforms) the two received output signals so that the period of each of the signals is equal to the average period PM determined in a step E8 and the calculates the optimized angular position PAO of the rotor 7 using the arctan of the values of the corrected signals in a step E9.

At any time, the control module 20 may filter the received or processed signals at a set cutoff frequency, for example anti-aliasing filtering using an analog-to-digital converter implemented by the control module 20 or impulse response filtering.

Exemplary Results

Figure 3:
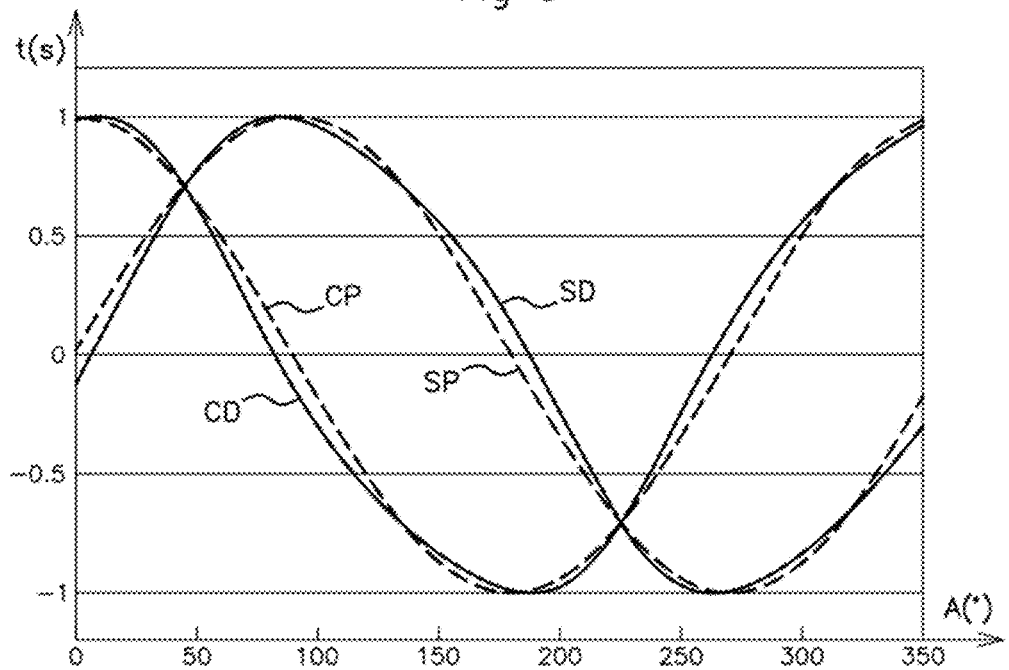
FIG. 3 illustrates an example of deformed sine and deformed cosine signals received from the sensor in relation to an ideal sine signal (i.e. one without deformation) and an ideal cosine signal.

FIG. 3 shows an example of deformed sine SD and deformed cosine CD signals received from the sensor 10 in relation to an ideal sine signal SP (i.e. one without deformation) and an ideal cosine signal CP in order to show the signal deviations which cause the error in estimating the angular position of the rotor 7.

Figure 4:
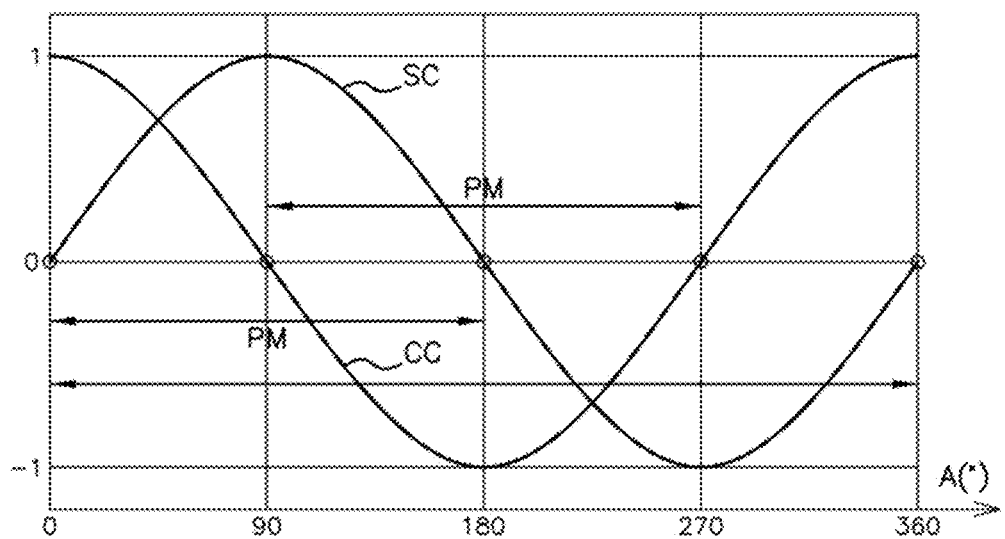
FIG. 4 illustrates an example of corrected sine and cosine signals with the average period determined by the control module with the rotation of the rotor in a steady state.

FIG. 4 shows an example of corrected sine SC and cosine CC signals with the average period PM determined by the control module 20 with the rotation of the rotor 7 in a steady state.

Figure 5:
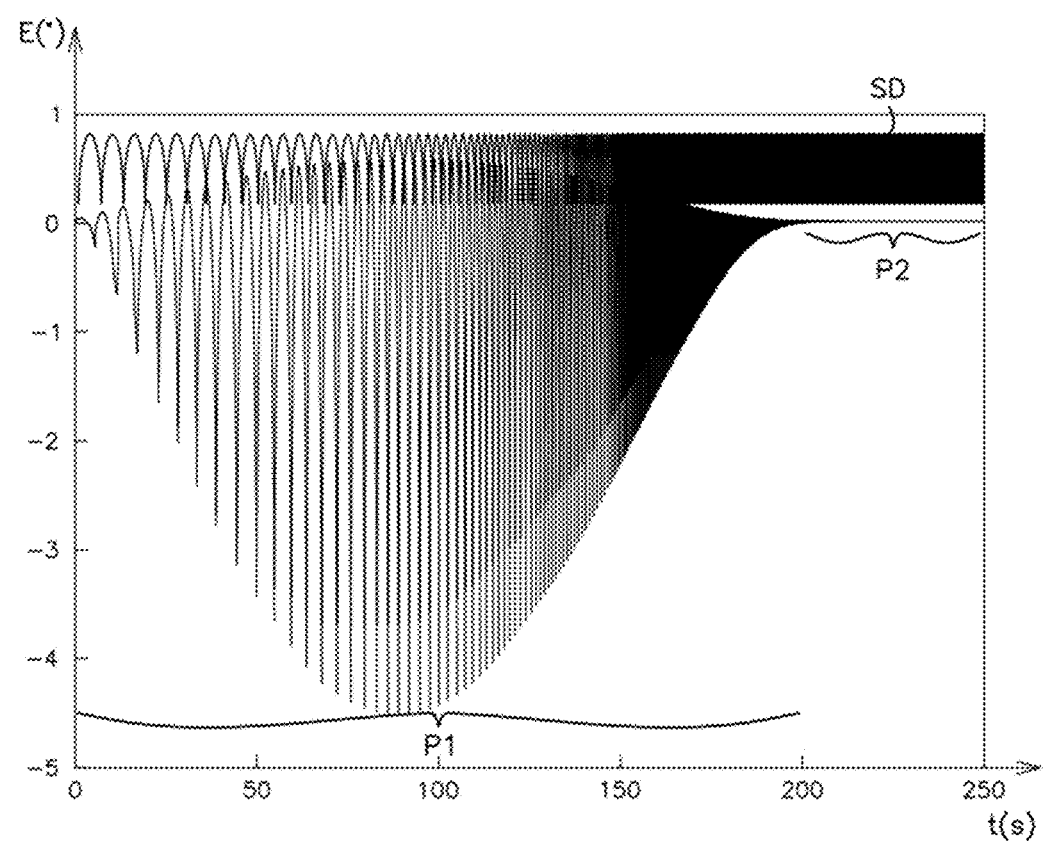
FIG. 5 illustrates an example of an error in estimating the angle of the rotor as a function of time in a rotor acceleration.

FIG. 5 shows an example of an error in estimating the angle of the rotor 7 as a function of time in a rotor 7 acceleration (phase P1 in which the method according to an aspect of the invention is not implemented). The error remains large in the transient state (high acceleration) but becomes near-zero once the rotor 7 has reached a steady state after about 200 seconds (phase P2 in which the method according to the invention is implemented).

An aspect of the invention has been described in terms of the application thereof to an electric machine 5 rotor 7 but the invention applies more generally to any vehicle 1 rotary element for which it is necessary to determine the angular position PA/PAO based on a sensor 10 simultaneously generating a sine-type signal and a cosine-type signal to characterize the angle of a rotary magnetic vector associated with said rotary element.

The invention claimed is:

1. A method for determining the position of a rotary element of a motor vehicle based on a position sensor configured to measure the position of the rotary element, to simultaneously generate a sine-type output signal and a cosine-type output signal reflecting an angular position of said rotary element as it rotates and to deliver these output signals to a control module of the vehicle, said method, implemented by said control module, comprising:

rotating the rotary element;
receiving the sine-type output signals and the cosine-type output signals generated by the position sensor as the rotary element rotates;
determining an average period of the sine-type output signals and the cosine-type output signals received within a predetermined time range;
correcting both received sine-type output signals and cosine-type output signals by at least one of correcting an amplitude, an offset, and an orthogonality of the respective output signals, such that a period of each of the signals is equal to the determined average period; and determining the angular position of the rotary element based on the corrected sine-type output signals and cosine-type output signals, wherein prior to determining the average period of the received output signals, determining an acceleration of the rotation of the rotary element by calculating a difference in rotational speed of the rotary element between two consecutive revolutions, determining the average period of and correcting the received output signals, and determining the angular position of the rotary element are implemented only when the acceleration value is lower than a predetermined acceleration threshold characterizing a steady state.

2. The method as claimed in claim 1, wherein the operation of determining the average period of the received output signals is carried out by calculating the average of the periods of each output signal in the predetermined time range, each period being measured for each of the two output signals between two consecutive zero amplitudes of said signal.

3. The method as claimed in claim 1, comprising, before correcting the output signals in terms of period, a step of checking that the average period is below a predefined period threshold.

4. The method as claimed in claim 1, wherein the acceleration is defined by calculating a difference in rotational speed of the rotary element between two consecutive revolutions.

5. The method as claimed in claim 1, comprising, prior to determining the average period or when the acceleration value is higher than the threshold, a step of correcting the output signals in terms of amplitude and offset.

6. The method as claimed in claim 1, comprising, prior to correcting the output signals in terms of period, a step of time-domain filtering the received signals at a predetermined cutoff frequency.

7. A non-transitory computer program product, comprising a set of program code instructions that, when they are executed by one or more processors, configure the one or more processors to implement a method as claimed in claim 1.

8. A control module for a vehicle, configured to implement the method as claimed in claim 1.

9. A motor vehicle comprising a rotary element, a sensor for the angular position of said rotary element and a control module as claimed in claim 8.

* * * * *